(12) United States Patent
Lotspiech et al.

(10) Patent No.: US 7,971,070 B2
(45) Date of Patent: Jun. 28, 2011

(54) READ/WRITE MEDIA KEY BLOCK

(75) Inventors: Jeffrey Bruce Lotspiech, Santa Clarita, CA (US); Scott Frazier Watson, Santa Clarita, CA (US)

(73) Assignees: International Business Machines Corporation, Armonk, NY (US); Disney Enterprises, Inc., Burbank, CA (US)

( * ) Notice: Subject to any disclaimer, the term of this patent is extended or adjusted under 35 U.S.C. 154(b) by 1153 days.

(21) Appl. No.: 10/905,570

(22) Filed: Jan. 11, 2005

(65) Prior Publication Data

US 2006/0153378 A1 Jul. 13, 2006

(51) Int. Cl.
*G06F 12/14* (2006.01)
(52) U.S. Cl. .................................. 713/193; 380/201
(58) Field of Classification Search .......... 380/200–202, 380/228, 45, 281; 713/193, 189; 726/26–33; 705/57–59, 51; 369/53.2, 59.22
See application file for complete search history.

(56) References Cited

U.S. PATENT DOCUMENTS

| | | | |
|---|---|---|---|
| 5,081,677 A | 1/1992 | Green et al. | |
| 5,177,791 A | 1/1993 | Yeh et al. | |
| 5,412,723 A | 5/1995 | Canetti et al. | |
| 6,118,873 A | 9/2000 | Lotspiech | |
| 6,181,870 B1 | 1/2001 | Okada et al. | |
| 6,609,116 B1 | 8/2003 | Lotspiech | |
| 6,738,878 B2 * | 5/2004 | Ripley et al. | 711/164 |
| 6,748,539 B1 | 6/2004 | Lotspiech | |
| 7,013,010 B2 * | 3/2006 | Ripley | 380/201 |
| 7,167,564 B2 * | 1/2007 | Asano et al. | 380/279 |
| 7,213,155 B2 * | 5/2007 | Sako et al | 713/189 |
| 7,269,257 B2 * | 9/2007 | Kitaya et al. | 380/45 |
| 7,283,633 B2 * | 10/2007 | Asano et al. | 380/281 |
| 7,305,711 B2 * | 12/2007 | Ellison et al. | 726/29 |
| 7,313,814 B2 * | 12/2007 | Zhu et al. | 726/6 |
| 7,340,603 B2 * | 3/2008 | Asano | 713/163 |
| 7,380,137 B2 * | 5/2008 | Bell et al. | 713/193 |

(Continued)

FOREIGN PATENT DOCUMENTS

CN 1389041 A 1/2003

(Continued)

OTHER PUBLICATIONS

Content Protection in Digital Home—Published Nov. 15, 2002 ISSN 1535-766X, vol. 06 Issue 04, Intel Tech Journal.
CPRM: End of Digital Media Piracy? Mark Joseph Edwards, Instantdoc#16482, Dec. 28, 2000.

(Continued)

*Primary Examiner* — Nirav B Patel
(74) *Attorney, Agent, or Firm* — Marc D. McSwain; Leonard T. Guzman; Mohammed Kashef

(57) ABSTRACT

A recorder system contains a media key block (MKB) and selectively writes protected content into a recording medium according to the following content protection logic, to combat theft of the protected content: If the medium does not have a MKB, then the recorder writes its stored MKB into the medium and writes protected content into the medium. If the medium has a MKB that is older than the stored MKB in the recorder, then the recorder writes its stored MKB into the medium before re-encrypting and writing protected content into the medium. If the medium has a MKB that is newer than the stored MKB, then the MKB in the medium is used for content protection. The recorder may store the newer MKB in non-volatile memory, effectively updating its previous stored MKB, so the recorder will have the most recently observed MKB for content protection use.

3 Claims, 1 Drawing Sheet

U.S. PATENT DOCUMENTS

| | | | |
|---|---|---|---|
| 7,461,406 B2* | 12/2008 | Pelly et al. ................. 726/27 |
| 7,570,762 B2* | 8/2009 | Kurihara et al. ............ 380/201 |
| 2001/0043799 A1* | 11/2001 | Okada et al. ................. 386/95 |
| 2002/0062313 A1 | 5/2002 | Lee et al. |
| 2002/0085722 A1 | 7/2002 | Asano et al. |
| 2002/0087814 A1 | 7/2002 | Ripley et al. |
| 2002/0087818 A1 | 7/2002 | Ripley et al. |
| 2002/0087871 A1 | 7/2002 | Ripley |
| 2002/0150251 A1* | 10/2002 | Asano et al. ................. 380/277 |
| 2002/0157011 A1* | 10/2002 | Thomas, III ................. 713/193 |
| 2002/0164034 A1 | 11/2002 | Asano et al. |
| 2003/0070083 A1 | 4/2003 | Nessler |
| 2004/0030909 A1* | 2/2004 | Sako et al. ................. 713/193 |
| 2004/0049689 A1 | 3/2004 | Wu et al. |
| 2004/0109569 A1 | 6/2004 | Ellison et al. |
| 2004/0120529 A1 | 6/2004 | Zhang et al. |
| 2004/0156503 A1 | 8/2004 | Bell et al. |
| 2004/0205315 A1 | 10/2004 | Ripley et al. |
| 2005/0038997 A1* | 2/2005 | Kojima et al. ................. 713/165 |
| 2005/0076225 A1* | 4/2005 | Talstra et al. ................. 713/187 |
| 2007/0172208 A1 | 7/2007 | Okada et al. |

FOREIGN PATENT DOCUMENTS

| | | |
|---|---|---|
| CN | 1525452 A | 9/2004 |
| WO | WO 03049106 A2 | 6/2003 |

OTHER PUBLICATIONS

Content Protection for Recordable Media (CPRM) Proposal From Jeffrey Bruce Lotspiech, Oct. 9, 2000.

IBM Corporation, "xCP: eXtensible Content Protection", Published on the web by IBM Research Division, Jul. 18, 2003. Available on the web at: http://www.broadcastpapers.com/whitepapers/xCP-eXtensible-Content-Protection.cfm?objid=32&pid... , 6 pages.

Author unknown, "DVD_Cutting_Master_Format_Specification, 6.0 Copy Protection Information File", printed from the web Oct. 13, 2004, 9 pages. http://www.dvdforum.org/DVD_Cutting_Master/CMF2-DVD-6.htm.

IBM Corporation, "Asset Management, xCP: Extensible Content Protection", 2003, BROADCASTPAPERS.Com, printed from the web Oct. 13, 2004, 4 pages. http://www.broadcastpapers.com/asset/IBMxCP02.htm.

Author unknown, "Protecting Digital Assets, Digital Content Protection, Part III", extremetech.com, printed from the web Oct. 13, 2004, 6 pages. http://www.extremetech.com/article2/0,3973,1230032,00.asp.

Author unknown, "Computer Peripherals, Copy Protection Comes Home, changes to industry standard could stamp your system with an indelible fingerprint", CPRM Copy Protection for Recordable Media and the ATA Standard, printed from the web Oct. 13, 2004, 7 pages. http://peripherals.about.com/library/weekly/aa010601a.htm.

* cited by examiner

READ/WRITE MEDIA KEY BLOCK

FIELD OF THE INVENTION

This invention generally relates to the management of cryptographic keys for controlling access to protected content, particularly for recordable media.

RELATED ART

The following patent applications and issued patents are hereby incorporated in their entirety by reference:
- U.S. Pat. No. 5,081,677 issued Jan. 14, 1992, "Cryptographic Key Version Control Facility".
- U.S. Pat. No. 5,177,791 issued Jan. 5, 1993, "Secure Translation of Usage-Control Values for Cryptographic Keys".
- U.S. Pat. No. 5,412,723 issued May 2, 1995, "Mechanism for Keeping a Key Secret from Mobile Eavesdroppers".
- U.S. Pat. No. 6,118,873 issued Sep. 12, 2000, "System for Encrypting Broadcast Programs in the Presence of Compromised Receiver Devices".
- U.S. Pat. No. 6,748,539B1 issued Jun. 8, 2004, "System and Method for Securely Checking In and Checking Out Digitized Content".
- U.S. Ser. No. 09/575,740 filed May 22, 2000, "Coincidence-Free Media Key Block for Content Protection for Recordable Media".

BACKGROUND OF THE INVENTION

The advantages of digitized video and music are numerous, but one significant drawback is that being digitized, the content is relatively easy to copy perfectly, without authorization by the copyright owner. Pirating of content currently costs content providers billions of dollars each year. Therefore, numerous schemes have been developed to address this problem, but not all are practical given the large number of content instances and devices that handle content.

U.S. Pat. No. 6,118,873 provides an encryption system for the secure broadcasting of programs, including updates to authorized in-home digital video devices. That patent discloses a system for encrypting broadcast music, videos, and other content such that only authorized player-recorders can play and/or copy the content and only in accordance with rules established by the vendor of the content. Authorized players or recorders are issued software-implemented device keys from a matrix of device keys termed a media key block (MKB). The keys can be issued simultaneously with each other or over time, but in any event, no player-recorder is supposed to have more than one device key per column of the matrix. Although two devices might share the same key from the same column, the chances that any two devices share exactly the same set of keys from all the columns of the matrix are very small when keys are randomly assigned. The keys are used to decrypt content. Devices may be 'revoked' by encrypting future protected content in various ways such that particular selected devices cannot decrypt it properly.

In the case of recordable media, content protection is conventionally based on having a media key block on each media instance (in this application, the term "media" may refer to a particular data storage item or a plurality of such data storage items). This MKB allows compliant devices to calculate a proper media key, while preventing circumvention devices from doing the same thing. Heretofore, it has been important that the MKB be read-only, even though the rest of the medium is, of course, read/write, i.e. recordable. The MKB needs to be read-only because of the following so-called "down-level media" attack: if the MKB were read/write, an attacker could write an old broken MKB on the medium, and then ask a compliant device to encrypt and record a piece of content of interest to the attacker. Since the MKB is broken, the attacker knows the media key and can decrypt this content. The attacker thus gets the protected content in the clear, effectively defeating the goal of the content protection scheme.

However, having a read-only area on read/write media is often problematic. For example, in DVD-RAM, DVD-R, and DVD-R/W media, the MKB is pre-embossed on the lead-in area, a part of the disc not written into by recorders. The lead-in area has a limited capacity. Therefore, this approach inherently limits the size of the MKB, thereby restricting the number of circumvention devices that can be revoked. In the case of DVD+R and DVD+R/W media, the lead-in area is read/write. The approach used in that technology is to write only a digest of the MKB into the "burst cut area" (BCA), a very limited read-only area near the hub of the disc, during manufacture. Writing into the BCA adds another $0.05 to the cost of each disc, unfortunately.

A potentially more serious problem is that these approaches require the disc replicator to be involved in the process. Not all disc replicators wish to become licensees of the given content protection scheme, so to date each type of media has two versions: one with MKBs, and one without. Since only the MKB-containing media can be used to record protected content, there is substantial potential for consumer confusion. Furthermore, the disc replicators have to be constrained by license not to put too many discs out with the same MKB. If they did, the media key of that MKB could become an important global secret, the compromise of which could do serious damage to the content protection scheme. But there is a cost/security tradeoff involved, because the cost of replication is strongly dependent on the number of identical replicas that can be made. To date, that tradeoff has been made entirely to favor low cost: the replicators are allowed to use a single MKB a million times.

SUMMARY OF THE INVENTION

It is accordingly an object of this invention to provide a read-only MKB stored in each recorder device, instead of having read-only MKBs on blank media from disc replicators. The recorder device selectively writes protected digital content onto a recording medium according to the age of the stored MKB and any MKB that may be present in the recording medium. If there is no MKB in the medium, the recorder writes its stored MKB into the medium and then proceeds to write the protected content. If the MKB in the medium is older than the stored MKB, then the recorder writes the stored MKB into the medium and then re-encrypts the protected content and then writes it, eliminating the possibility that a broken older MKB can be used for piracy. If the MKB in the medium is newer than the stored MKB, then the recorder uses the newer MKB for writing protected content, but can optionally update its stored MKB with the newer MKB, eliminating the possibility that a broken older stored MKB can be used for piracy. Any recordable medium having a unique media ID or serial number can be employed by the system to store protected content. Costly modifications to media during manufacture can be avoided, and limitations to the size of MKBs are effectively eliminated.

DETAILED DESCRIPTION OF THE INVENTION

Figure 1:
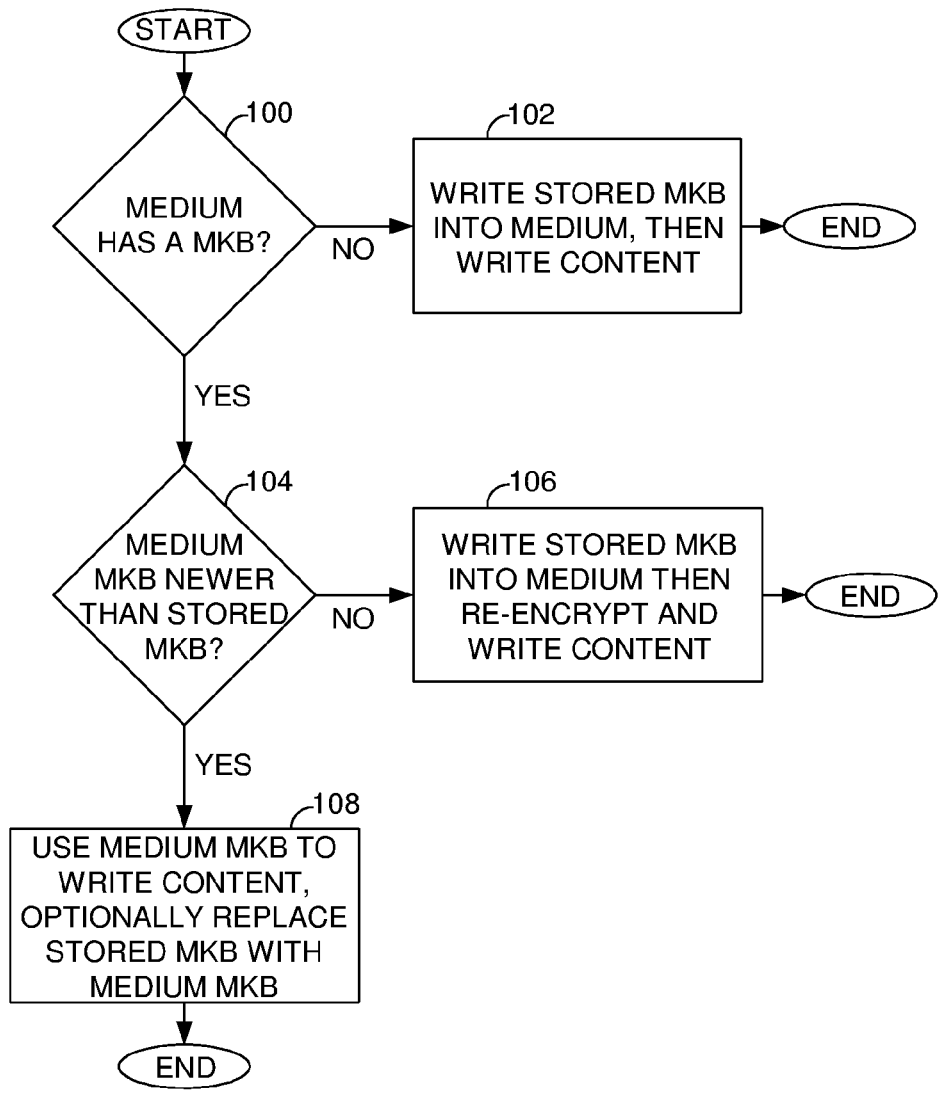
FIG. 1 is a flowchart of steps taken to combat theft of protected digital content through media key block validation, according to an embodiment of the invention.

In an exemplary embodiment, the present invention eliminates the difficulties described above by having a read-only MKB stored in each recorder device, instead of having read-only MKBs on blank media from disc replicators. The recorder can selectively write the stored MKB onto the media. There are several schemes known in the art for efficiently enabling a device to cryptographically determine which of two keys is the more recent, so the invention capitalizes on these schemes to help solve the problems with the conventional approaches described above. See for example U.S. Pat. Nos. 5,081,677 and 5,412,723, which describe the use of version numbers for cryptographic keys that are periodically "refreshed" for enhanced security. Note however that the invention is not limited to any specific scheme for determining the relative age of keys or MKBs. Therefore, referring now to FIG. 1 and according to the present invention, when a recorder is asked to record a piece of protected content, the content protection logic followed in the recorder is as follows:
1. If the media has no MKB, as determined in step 100, then in step 102 the recorder first writes its own MKB into the media before writing the content protected by that MKB.
2. Otherwise, the recorder compares the existing MKB on the media with its own MKB in step 104. If the MKB on the media is older, then in step 106 the recorder replaces the MKB on the media with its own. As part of that replacement, the recorder must re-encrypt all titles currently on the media with a key based on the newer (i.e. the recorder's) media key.
3. If the MKB on the media is more recent, then in step 108 the recorder uses the MKB on the media instead of its own. If the recorder has its own internal non-volatile memory, then it can store the more recent MKB in that memory, and then from that point on use the more recent MKB as its own MKB for content protection.

Thus, with the present invention, MKBs no longer have any practical restriction in size. Also, any piece of blank media can be used as content-protected media, as long as it has a unique serial number or media ID, so consumer confusion is avoided. (If cloned serial numbers were used, those pieces of identical media could be used to make unauthorized copies by just making a bit-for-bit copy.) Finally, since recorder-player devices already employ programmable read-only memory for unique device keys, having a unique MKB per device would only require slightly more programmable storage, not a new and costly disc manufacturing step. Therefore, with the present invention, the chance that media keys could become global secrets would be greatly reduced.

There are some subtleties, however. If the MKB changes, then every encrypted title key has to be updated, and recorders generally are not cognizant of all possible formats of content. They do not know where the encrypted title keys are stored for the unknown formats, and thus are not able to re-encrypt them when they change the MKB. This problem is solved simply by having different MKBs for different formats. The recorder only updates MKBs of the formats it understands. However, a "backup MKB" protocol may be defined so that content is not lost if a recorder fails during the updating. An exemplary backup MKB protocol is as follows:

If the encrypted title keys are in a single file, then the recorder renames the old encrypted title keys to a defined backup name before beginning to write the new encrypted title keys file via these logical steps:
1. Check to see if both a backup MKB and a backup encrypted title keys file exists. If they both exist then go to step 2, else erase the remaining backup file and exit.
2. If the current MKB does not exist or is corrupt then rename the backup MKB and backup encrypted title keys file to the current files and exit.
3. Decrypt the title keys in the backup title keys file using the backup MKB, and re-encrypt the title keys using the current MKB, writing the current title keys file.
4. Delete the backup MKB and the backup title keys file, modifying any nonce associated with the backup encrypted title key file.

In some applications, encrypted title keys may be found in more than one file. In that case, the recorder runs the backup protocol separately for each file, not deleting the backup MKB until all title keys files have been processed.

Further, if the MKB is simply a file in a file system, it might be difficult for the recorder to find it (i.e. for optical media, the disc drive authentication requires the disc to read the MKB, but from where?). Disc drives are not accustomed to understanding the format of the file system on the disc and would prefer to simply access data at fixed locations on the disc. This preference can be accommodated by having the disc format operation place the MKB at a pre-defined location on the disc, in addition to placing it logically in the file system. Subsequent MKBs can simply overwrite a previous MKB in the same place. Recorders must not accept discs that have not been correctly formatted, and must be able to format them themselves and then write an "authentication MKB". Recorders must undoubtedly perform the formatting for other reasons. The authentication MKB should be in addition to all the format-specific MKBs, and the recorder must be prepared to update any MKB that it knows. It always knows about the authentication MKB.

Historically, attackers who want to use circumvention programs save old media for a down-level media attack, as they hope that those MKBs will be broken. This invention changes the nature of the attacks possible against the content protection scheme. For example, in the current state of the art, the attackers employ an attack where they save media that comes out when the scheme was first introduced, before there were any revocations. Once circumvention devices (e.g. rogue recorders) appear, they will be revoked for new media, but will still be able to use the old media. Next, the attackers ask compliant recorders to record content on the old media. The attackers then use the circumvention device to make unauthorized copies. This attack is somewhat obviated by MKB extensions, which the attacker must avoid, but MKB extensions are always optional.

In the present invention, the analogous attack proceeds as follows: the attacker buys devices (instead of media) that come out when the scheme is first introduced. These old recorders format media with old media key blocks. The attackers ask the old devices to record content, and then use the circumvention devices to make unauthorized copies. The attacker has to avoid using a particular media in a new recorder—the attack becomes even more difficult if the recorders have non-volatile storage for the latest updated MKB they've seen for subsequent writing use.

What if a rogue replicator clones the supposedly unique IDs of the media? In this case, in both the prior art and in the present invention, the only recourse is legal. Consider the legal situation in the current state of the art. If the replicator has licensed the content protection scheme and built cloned media, he is in violation of that license. If he is not a licensee, then he has violated the intellectual property of the content protection scheme: the copyrighted MKB, the trade secrets, and the relevant patents. In either case, the replicator might be accused of having circumvented "technical protection means" and be liable to prosecution under the U.S. Digital Millennium Copyright Act (DMCA).

The present invention allows the possibility that replicators need not be licensees of the content protection scheme. If the replicator need not be a licensee, then all media will be usable for content protection, and there will be less chance of user confusion. In this case, the content protection scheme's owners might have no status in court if a replicator is cloning, and protection falls back on the strength of the DMCA. However, replicators must always be licensees of the particular media format. If the format license makes the reasonable demand that unique IDs must actually be unique, then the legal situation reverts to the way it was before the present invention. It is just that the format owner, not the content protection scheme owner, is now the legally injured party.

If for some reason this situation is not satisfactory, the content protection scheme can add some licensable element to the media. The media ID might be divided into two parts, for example, a unique ID and an encryption of that ID with a secret key available only with the license. Player devices would be given the key so they can check that the two halves match. Players would only play licensed media. However, this license would presumably be less onerous to the replicators, because it would no longer restrict the number of replicas, and need not require an ongoing license fee. It is possible that all replicators would choose to be licensees under these terms, and consumer confusion would be avoided.

It is also within the scope of this invention to have the replicators initially record the authentication MKB at the time of media manufacture. In that case, the consumer confusion problem returns, but the security of the content protection scheme is increased as the attack mentioned before now requires both an old media and an old player to succeed.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular READ/WRITE MEDIA KEY BLOCK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A method for a recording device to record protected content from a readable storage medium to a recordable storage medium using a read-only media key block (MKB) stored in the recording device, wherein the recordable storage medium does not have an updated MKB when manufactured, said method comprising:
   (a) storing the read-only MKB in the recording device, wherein: the read-only MKB is self-authenticating by authenticating a digital signature of the MKB, such that the recording device knows if the MKB has been compromised, the read-only MKB comprises a matrix of device keys that allow a compliant recording device to calculate a media key and prevent a circumvention recording device from calculating a media key, and
   the recordable storage medium comprises a unique serial number, wherein the unique serial number comprises at least one unique identification number and an encryption of the at least one unique identification number, and is used by the recording device to prevent use of cloned serial numbers such that pieces of identical media can not be used to make unauthorized copies of the protected content by making a bit-for-bit copy;
   (b) if the recordable storage medium does not have a MKB, then writing the stored read-only MKB onto the recordable storage medium by having a disc format operation of the recording device write the stored read-only MKB at a pre-defined location on the recordable storage medium and logically in a file system of the recordable storage medium, and then writing the protected content from the readable storage medium to the recordable storage medium;
   (c) if the recordable storage medium has a MKB that is older than the stored read-only MKB, then writing the stored read-only MKB into the recordable storage medium by having a disc format operation of the recording device write the stored read-only MKB at a pre-defined location on the recordable storage medium where the older MKB was stored and logically in a file system of the recordable storage medium, and then re-encrypting and writing the protected content from the readable storage medium to the recordable storage medium, wherein all titles currently on the recordable storage medium are re-encrypted with a media key that is based on the read-only MKB; and
   (d) if the recordable storage medium has a MKB that is newer than the stored read-only MKB, then using the MKB from the recordable storage medium for writing the protected content from the readable storage medium to readable storage medium and replacing the MKB stored on the recording device with the newer MKB from the recordable storage medium that is temporarily stored in a non-volatile memory of the recording device.

2. A recording device for recording protected content from a readable storage medium to a recordable storage medium using a read-only media key block (MKB) stored in the recording device, wherein the recordable storage medium does not have an updated MKB when manufactured, said recording device comprising:
- a storage medium that stores the read-only MKB, wherein:
  - the read-only MKB is self-authenticating by authenticating a digital signature of the MKB, such that the recording device knows if the MKB has been compromised,
- the read-only MKB comprises a matrix of device keys that allow a compliant recording device to calculate a media key and prevents a circumvention recording device from calculating a media key, and
- the recordable storage medium comprises a unique serial number, wherein the unique serial number comprises at least one unique identification number and an encryption of the at least one unique identification number, and is used by the recording device to prevent use of cloned serial numbers such that pieces of identical media can not be used to make unauthorized copies of the protected content by making a bit-for-bit copy; and
- a processor coupled to the storage medium and the non-volatile memory device that:
  - if the recordable storage medium does not have a MKB, then writing the stored read-only MKB onto the recordable storage medium by having a disc format operation of the recording device write the stored read-only MKB at a pre-defined location on the recordable storage medium and logically in a file system of the recordable storage medium, and then writing the protected content from the readable storage medium to the recordable storage medium,
  - if the recordable storage medium has a MKB that is older than the stored read-only MKB, then writing the stored read-only MKB into the recordable storage medium, by having a disc format operation of the recording device write the stored read-only MKB at a pre-defined location on the recordable storage medium where the older MKB was stored and logically in a file system of the recordable storage medium, and then re-encrypting and writing the protected content from the readable storage medium to the recordable storage medium, wherein all titles currently on the recordable storage medium are re-encrypted with a media key that is based on the read-only MKB, and
  - if the recordable storage medium has a MKB that is newer than the stored read-only MKB, then using the MKB from the recordable storage medium for writing the protected content from the readable storage medium to readable storage medium and replacing the MKB stored on the recording device with the newer MKB from the recordable storage medium that is temporarily stored in a non-volatile memory of the recording device.

3. A computer program product for a recording device to record protected content from a readable storage medium to a recordable storage medium using a read-only media key block (MKB) that is stored in the recording device, wherein the recordable storage medium does not have an updated MKB when manufactured, the computer program product usable with a programmable computer having readable program code embodied on a computer readable non-transitory storage medium, the computer readable program code when executed on a computer causes the computer to perform the steps of:
- (a) storing a read-only medial key block (MKB) in a recording device, wherein:
  - the read-only MKB is self-authenticating by authenticating a digital signature of the MKB, such that the recording device knows if the MKB has been compromised, the read-only MKB comprises a matrix of device keys that allow a compliant recording device to calculate a media key and prevent a circumvention recording device from calculating a media key, and
  - the recordable storage medium comprises a unique serial number, wherein the unique serial number comprises at least one unique identification number and an encryption of the at least one unique identification number, and is used by the recording device to prevent use of cloned serial numbers such that pieces of identical media can not be used to make unauthorized copies of the protected content by making a bit-for-bit copy;
- (b) if the recordable storage medium does not have a MKB, then writing the stored read-only MKB onto the recordable storage medium by having a disc format operation of the recording device write the stored read-only MKB at a pre-defined location on the recordable storage medium and logically in a file system of the recordable storage medium, and then writing the protected content from the readable storage medium to the recordable storage medium;
- (c) if the recordable storage medium has a MKB that is older than the stored read-only MKB, then writing the stored read-only MKB into the recordable storage medium by having a disc format operation of the recording device write the stored read-only MKB at a pre-defined location on the recordable storage medium where the older MKB was stored and logically in a file system of the recordable storage medium, and then re-encrypting and writing the protected content from the readable storage medium to the recordable storage medium, wherein all titles currently on the recordable storage medium are re-encrypted with a media key that is based on the read-only MKB; and
- (d) if the recordable storage medium has a MKB that is newer than the stored read-only MKB, then using the MKB from the recordable storage medium for writing the protected content from the readable storage medium to readable storage medium and replacing the MKB stored on the recording device with the newer MKB from the recordable storage medium that is temporarily stored in a non-volatile memory of the recording device.

* * * * *